United States Patent
Wang (10) Patent No.: US 7,494,153 B2
(45) Date of Patent: Feb. 24, 2009

(54) ANTI-ROLL THRUST SYSTEM FOR VEHICLES

(75) Inventor: Jenne-Tai Wang, Troy, MI (US)

(73) Assignee: General Motors Corporation, Detroit, MI (US)

( * ) Notice: Subject to any disclaimer, the term of this patent is extended or adjusted under 35 U.S.C. 154(b) by 468 days.

(21) Appl. No.: 11/049,555

(22) Filed: Feb. 2, 2005

(65) Prior Publication Data

US 2005/0230176 A1     Oct. 20, 2005

Related U.S. Application Data

(60) Provisional application No. 60/562,143, filed on Apr. 14, 2004.

(51) Int. Cl.
*B60R 21/00* (2006.01)
(52) U.S. Cl. ........................... 280/755; 280/298
(58) Field of Classification Search ................ 280/755, 280/298, 299, 300; 180/209
See application file for complete search history.

(56) References Cited

U.S. PATENT DOCUMENTS 3,580,354 A * 5/1971 Hewitt ..................... 180/282
3,995,656 A 12/1976 Mills, Jr.
5,401,055 A * 3/1995 Pham ....................... 280/755
5,765,783 A * 6/1998 Albion ....................... 244/7 B
5,931,499 A * 8/1999 Sutherland ............... 280/755
6,065,558 A 5/2000 Wielenga
6,095,459 A 8/2000 Codina
6,170,847 B1 * 1/2001 Pham ....................... 280/298
6,394,738 B1 * 5/2002 Springer ................... 414/673
6,556,908 B1 4/2003 Lu et al.
6,588,799 B1 * 7/2003 Sanchez ................... 280/755
6,938,924 B2 9/2005 Feldman et al.

OTHER PUBLICATIONS

SAE 950306, "Analysis of Simple Rollover Metrics," Lund and Bernard (p. 23-40).
Special Report 265, The National Highway Traffic Safety Administration's "Rating System for Rollover Resistance—An Assessment," (p. iv-135).
USPTO Office Action of Oct. 6, 2006 for U.S. Appl. No. 11/049,448.

* cited by examiner

*Primary Examiner*—Toan C To (57) ABSTRACT

A thruster system is provided for a vehicle that can be used to reduce the roll propensity of a motor vehicle. The system utilizes a control system and multiple sets of thrusters which are strategically placed upon the vehicle. The control system is provided for detecting a potential roll condition and activates selected ones of the thrusters to produce a necessary thrust force for counteracting roll forces.

2 Claims, 4 Drawing Sheets

ANTI-ROLL THRUST SYSTEM FOR VEHICLES

CROSS REFERENCE TO RELATED APPLICATION

This application claims the benefit of U.S. Provisional Application No. 60/562,143, filed on Apr. 14, 2004, the disclosure of which is incorporated herein by reference.

FIELD OF THE INVENTION

The present invention relates to an anti-roll system for a vehicle, and more particularly, to an anti-roll system which employees thrusters mounted to the vehicle for resisting roll forces acting on a vehicle.

BACKGROUND OF THE INVENTION

Auto manufacturers have developed systems to aid in vehicle stability, such as variable ride height suspension systems, anti-lock braking systems and electronic stability control systems. Variable ride height suspension systems are capable of lowering a vehicle's height while driving at high speeds and while making sharp corners in order to reduce the height of the vehicles center of gravity and thereby reduce its likelihood of a rollover. Anti-lock braking systems control the braking forces applied to prevent the wheels from locking up and/or skidding and thereby helping the driver maintain control of the vehicle. Electronic stability control systems are capable of altering the stiffness of the vehicle suspension system in response to certain vehicle driving conditions.

In addition, auto manufacturers have developed further vehicle safety features to help protect the passengers in the event of an accident. These systems include seat belts and side and front airbags. Although all of the above systems have proven to be effective at improving vehicle stability and in protecting occupants, there is still a need to improve the vehicle roll resistance.

SUMMARY OF THE INVENTION

The present invention is directed to a thruster system that is designed to reduce the roll propensity of a motor vehicle when needed. The system includes a first thruster mounted on a first side of the motor vehicle and a second thruster mounted on a second side of the motor vehicle. A controller system is provided for detecting a potential roll condition of the vehicle and activating one of the first and second thrusters for generating a counteracting force for resisting the detected potential roll condition.

According to one aspect of the present invention, the first and second thrusters are each mounted in a side pillar of the motor vehicle.

According to yet another aspect of the present invention, the first and second thrusters are rocket motors.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
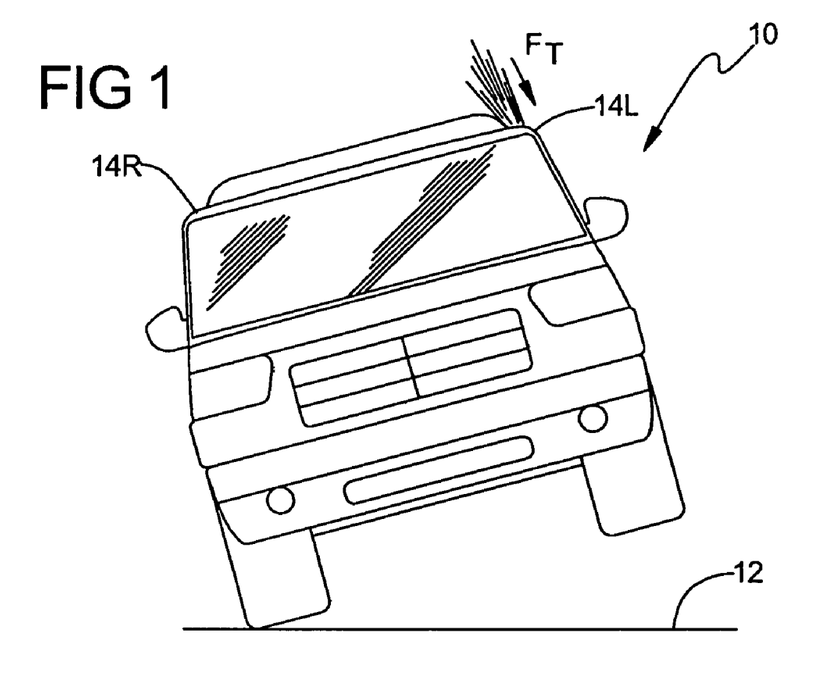
FIG. 1 is a schematic view of a vehicle having a thruster located in the roof of a vehicle for applying a roll resisting force to the vehicle.
Figure 3:
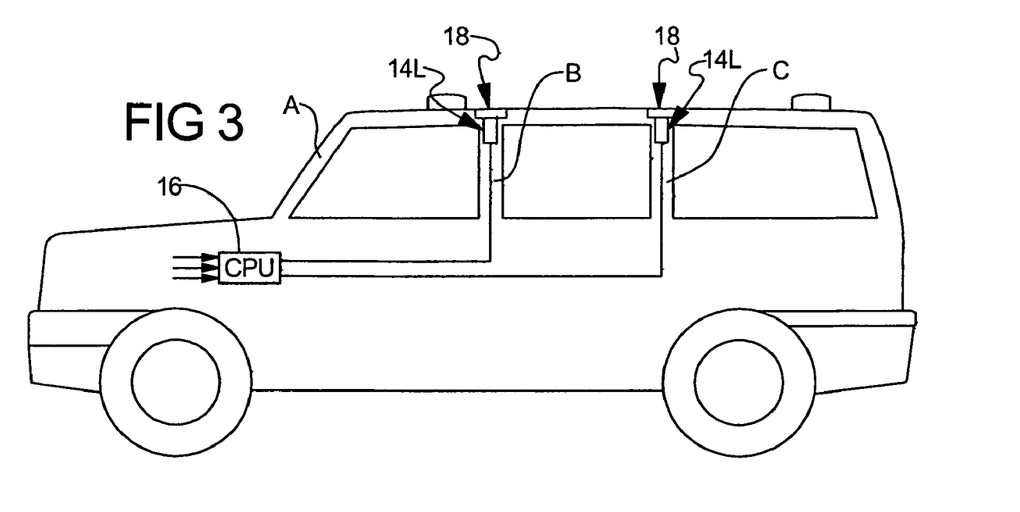
FIG. 3 is a side view illustrating exemplary potential mounting locations of the thrusters according to the principles of the present invention.

With reference to FIG. 1, a vehicle 10 is shown experiencing roll forces relative to a surface 12 with the vehicle 10 having a thruster 14 activated for applying a force ($F_T$) for resisting the roll forces of the vehicle 10. According to the present invention, the vehicle 10 is provided with one or more thrusters 14 provided on each side of the vehicle and mounted within one of the A pillar, B pillar, or C pillar of the vehicle. It should be understood that the thrusters can also be mounted to other advantageous locations of the vehicle including the engine compartment, trunk, door, or anywhere else where the thruster force is desired and where packaging space can be found for the thrusters. As illustrated in FIG. 3, multiple thrusters 14L, 14R can be provided on each side of the vehicle. It should be understood that although thrusters 14L are illustrated in FIG. 3 on the left hand side of the vehicle, thrusters 14R are mounted to the right hand side of the vehicle in the same manner as illustrated in FIG. 3. The thrusters 14L, 14R are controlled by a central processor unit 16 which receives input signals representative of vehicle driving condition. From these vehicle driving conditions, the central processor unit 16 is capable of determining the roll forces acting on the vehicle and activating the thrusters 14L, 14R in order to apply an anti-roll thruster force $F_T$ for resisting the roll forces.

Figure 2:
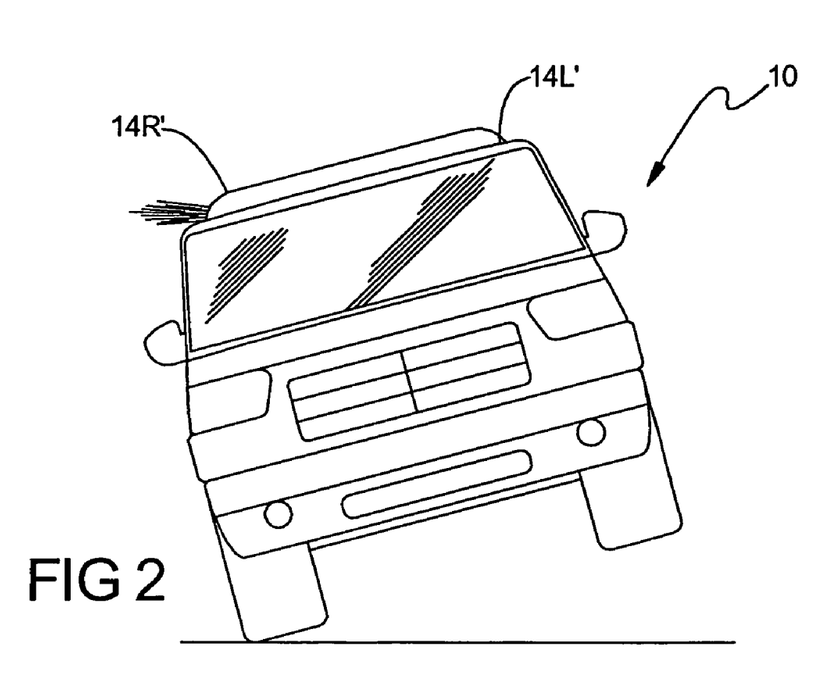
FIG. 2 is a schematic diagram of a vehicle having a thruster system provided as an add-on device to a motor vehicle according to the principles of the present invention.

As illustrated in FIG. 3, thruster doors 18 can be employed in order to cover the thrusters 14L, 14R and provide the vehicle with a refined aesthetic appearance. The thruster doors 18 can be designed to hingedly open or otherwise open or release upon activation of the thrusters 14L, 14R. The direction of the thrust force can be adjusted for the vehicle mounting location of the thrusters and other factors. As illustrated in FIG. 2, the thrusters 14L', 14R' can also be employed as an add-on device which can be mounted to the vehicle roof and can possibly even be employed with a vehicle roof rack system. The direction of the nozzles of the thrusters 14L', 14R' can be designed such that they would not be interfered with by cargo supported on the roof rack.

The present invention utilizes an equivalent design strategy in order to provide a thruster system which can apply a force to the vehicle in order to provide the vehicle in question with equivalent roll force characteristics to predetermined vehicle roll force characteristics. In other words, the thrusters 14 apply a force $F_T$ so as to give the vehicle an equivalent roll force characteristic as an exemplary roll performance target.

In utilizing the equivalent design strategy, three different design strategies are discussed in greater detail herein. First is the equivalent static stability factor (SSF) design strategy, the second is the equivalent critical sliding velocity (CSV) design strategy, and the third is the equivalent critical roll rate (CRR) design strategy. To illustrate the effect of these design strategies on the thruster design, as well as other special features of the invention, an exemplary vehicle and exemplary roll performance target are used in the examples discussed below.

For the equivalent SSF (static stability factor) design strategy, the thrusters 14L, 14R are designed such that they will produce enough thrust to make up the difference of the static stability factor (SSF) values between the exemplary vehicle and the target SSF value. The sum of the SSF value and the make-up part contributed by the thrusters is called the effective static stability factor (ESSF). The static stability factor equation is:

$$\frac{T}{2h_{CG}}$$

Figure 4:
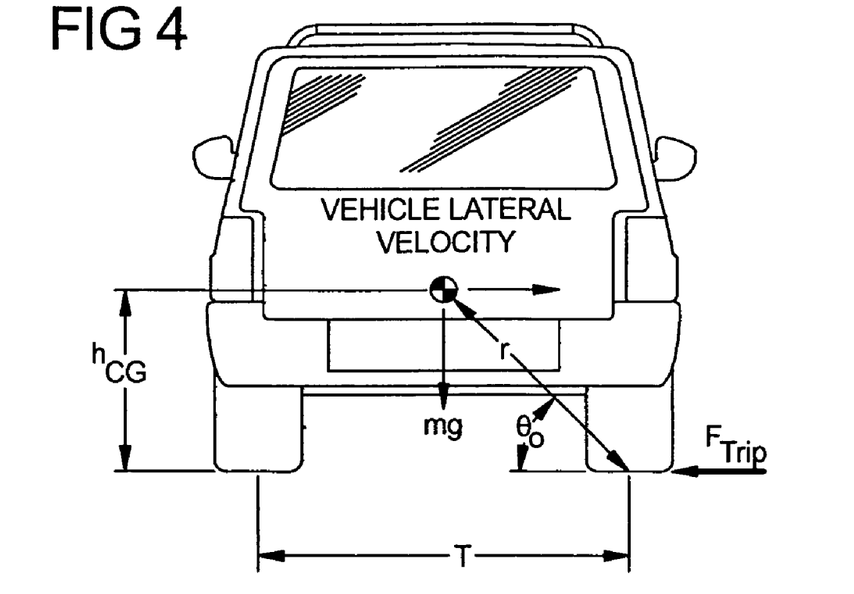
FIG. 4 is a schematic illustration of a vehicle force diagram.

The SSF combines track width and center of gravity, two key components of vehicle stability. The SSF is a measure that equals one-half the track width (T) divided by the height of the center of gravity ($h_{CG}$) above the road. With reference to FIG. 4, the necessary roll condition for a vehicle utilizing the SSF is:

$$F_{TRIP} h_{CG} - mg\left(\frac{T}{2}\right) > 0$$

which results in $$\frac{F_{TRIP}}{mg} > \frac{T}{2h_{CG}}$$

where T is the track width, m is the vehicle mass, g is gravity, $h_{CG}$ is the height of the center of gravity of the vehicle, and $F_{TRIP}$ is the trip force applied to the vehicle that would lead to roll condition.

Since in the above equation, when the value of the SSF factor (the right hand term in the above equation) is large, the magnitude of the trip force ($F_{TRIP}$) must also be large in order to cause a vehicle roll condition. Thus, the larger the SSF factor, the less likely the vehicle is to have a roll event.

Table 1 below provides exemplary data from a target vehicle and an example vehicle relevant to the static stability factor. In particular, the target SSF value calculates to be 1.37 while the SSF value for the example vehicle is 1.07.

TABLE 1

|  | T mm | $h_{CG}$ mm | Mass kg | $I_{CG}$ kg-m^2 | SSF |
|---|---|---|---|---|---|
| Target Values | 1467 | 535 | 1577 | 568 | 1.37 |
| Example Vehicle | 1419 | 664 | 1729 | 580 | 1.07 |

Employing the equivalent SSF design strategy, the necessary roll condition for the exemplary vehicle becomes:

$$\left[\frac{F_{TRIP}}{mg}\right]_{EXAMPLE} > \overbrace{\left[\frac{T}{2h_{CG}}\right]_{EXAMPLE} + \left[\frac{F_T X}{mgh_{CG}}\right]_{EXAMPLE}}^{ESSF}$$

where X is the average distance from the thrusters to the tripping point perpendicular to the vehicle roll axis, while the necessary roll condition for the target vehicle is:

$$\left[\frac{F_{TRIP}}{mg}\right]_{TARGET} > \overbrace{\left[\frac{T}{2h_{CG}}\right]_{TARGET}}^{SSF}$$

In order to make these two conditions equivalent, their right hand terms must be equal:

$$\left[\frac{T}{2h_{CG}}\right]_{EXAMPLE} + \left[\frac{F_T X}{mgh_{CG}}\right]_{EXAMPLE} = \left[\frac{T}{2h_{CG}}\right]_{TARGET}$$

which solved for the value of the force of the anti-roll thruster ($F_T$) results in the equation:

$$F_T = \left[\left(\frac{SSF_{TARGET}}{SSF_{EXAMPLE}}\right) - 1\right]\left(\frac{mgT}{2X}\right)_{EXAMPLE}$$

Thus, in order to make the example vehicle have an equivalent SSF value to the target vehicle, the equation can be solved to obtain the corresponding thruster specification as illustrated in Table 2 reproduced below. From the above equation, the thrust force ($F_T$) of the thruster is calculated to be 1.75 kN. From this value, other design specifications for the thruster, such as required mass flow rate and nozzle throat area can also be calculated based on the required thrust force.

TABLE 2

|  | SSF | ESSF |
|---|---|---|
| Target | 1.37 | 1.37 |
| Example Vehicle | 1.07 | 1.07 |
| Example Vehicle W/Thruster - Equivalent SSF | 1.07 | 1.37 |

| Anti-Rollover Thruster Specification | Equivalent SSF |
|---|---|
| Thrust force, kN | 1.75 |
| Mass flow rate, kg/s | 3.51 |
| Sonic speed of nitrogen gas at 600° K, m/s | 499 |
| Total nozzle throat area, m^2 | 0.0019 |
| Throat diameter of one nozzle design, mm | 49 |
| Throat diameter of two nozzles design, mm | 35 |
| Thrusting duration, msec | ? |

TABLE 2-continued

| | |
|---|---|
| Total gas mass, kg | ? |
| Activation threshold | ? |

For the equivalent critical sliding velocity (CSV) design strategy, the thrusters are so designed that they will produce just enough thrust force to make up the difference of the CSV values between the example vehicle and the target vehicle characteristics. The sum of the CSV value and the make-up part contributed by the thrusters is called the effective critical sliding velocity (ECSV). The critical sliding velocity equation for a quarter turn roll is:

$$CSV = \sqrt{\frac{2gI_O}{mh_{CG}^2}\left(\sqrt{\frac{T^2}{4} + h_{CG}^2} - h_{CG}\right)}$$

where $I_O$ is the vehicle's moment of inertia about the point of application of the $F_{TRIP}$ force. Specifically, the equation for the moment of inertia about this point is:

$$I_O = I_{CG} + m\left(\frac{T^2}{4} + h_{CG}^2\right).$$

The relevant values for determining the CSV for the target vehicle and example vehicle are provided in Table 3 where the value T is the track width, the value $h_{CG}$ is the height of the center of gravity of the vehicle, m is the mass of the vehicle, and $I_{CG}$ is the moment of inertia about the center of gravity of the vehicle.

TABLE 3

| | T mm | $h_{CG}$ mm | Mass kg | $I_{CG}$ kg-m^2 | SSF | CSV m/s |
|---|---|---|---|---|---|---|
| Target | 1467 | 535 | 1577 | 568 | 1.37 | 5.50 |
| Example Vehicle | 1419 | 664 | 1729 | 580 | 1.07 | 4.18 |

The values provide a CSV value for the target vehicle of 5.5 and a CSV value for the example vehicle of 4.18. Utilizing the equivalent CSV design strategy, the equivalent CSV value for the example vehicle is determined by the equation:

$$[ECSV]_{EXAMPLE} = \left[\sqrt{CSV^2 + \frac{2I_O F_T X \hat{\theta}}{m^2 h_{CG}^2}}\right]_{EXAMPLE}$$

where the value $\hat{\theta}$ is defined by the equation:

$$\hat{\theta} = \frac{\pi}{2} - \theta_0 \text{ and } \theta_0 = \tan^{-1}\left(\frac{2h_{CG}}{T}\right),$$

while the CSV value for the target is determined by the equation:

$$[CSV]_{TARGET} = \left[\sqrt{\frac{2gI_O}{mh_{CG}^2}\left(\sqrt{\frac{T^2}{4} + h_{CG}^2} - h_{CG}\right)}\right]_{TARGET}$$

By making the value of $[ECSV]_{EXAMPLE}$ equal to the value $[CSV]_{TARGET}$, the equation can be solved for the required force of the anti-roll thruster ($F_T$) according to the following equation:

$$F_T = \left[\frac{m^2 h_{CG}^2}{2I_O X \hat{\theta}}\right]_{EXAMPLE} \{[CSV]_{TARGET}^2 - [CSV]_{EXAMPLE}^2\}$$

Table 4 below provides the results of the calculation utilizing the equivalent CSV design strategy as well as a comparison of the equivalent SSF design strategy. For the equivalent CSV design strategy, a thrust force of 2.38 kN is determined to be necessary in order to provide the example vehicle with an equivalent CSV value to the target vehicle. From this value, the required mass flow rate and nozzle throat area are then calculated based on required thrust force as illustrated in Table 4.

TABLE 4

| | SSF | ESSF | CSV m/s | ECSV m/s |
|---|---|---|---|---|
| Target | 1.37 | 1.37 | 5.50 | 5.50 |
| Example Vehicle | 1.07 | 1.07 | 4.18 | 4.18 |
| Example Vehicle w/Thruster - Equivalent SSF | 1.07 | 1.37 | 4.18 | 5.18 |
| Example Vehicle w/Thruster - Equivalent CSV | 1.07 | 1.48 | 4.18 | 5.50 |

| Thruster Specification | Equivalent SSF | Equivalent CSV |
|---|---|---|
| Thrust force, kN | 1.75 | 2.38 |
| Mass flow rate, kg/s | 3.51 | 4.77 |
| Sonic speed of nitrogen gas at 600° K, m/s | 499 | 499 |
| Total nozzle throat area, m^2 | 0.0019 | 0.0026 |
| Throat diameter of one nozzle design, mm | 49 | 57 |
| Throat diameter of two nozzles design, mm | 35 | 41 |
| Thrusting duration, msec | ? | ? |
| Total gas mass, kg | ? | ? |
| Activation threshold | ? | ? |

For the equivalent critical roll rate (ECRR) design strategy, the thrusters are so designed that they will produce just enough thrust force to make up the difference of the CRR (critical roll rate) value between a given example vehicle and a target vehicle. The sum of the CRR value and the make-up part contributed by the force of the thrusters is called the effective critical roll rate (ECRR). The value of $\Theta_0$ as illustrated in FIG. 4, which is the initial angle between the ground and a line extending between the center of gravity of the vehicle CG and the edge of the track width T for the example vehicle. For the critical roll rate calculation, the value:

$\Theta_0 \geq CRR$

Figure 5:
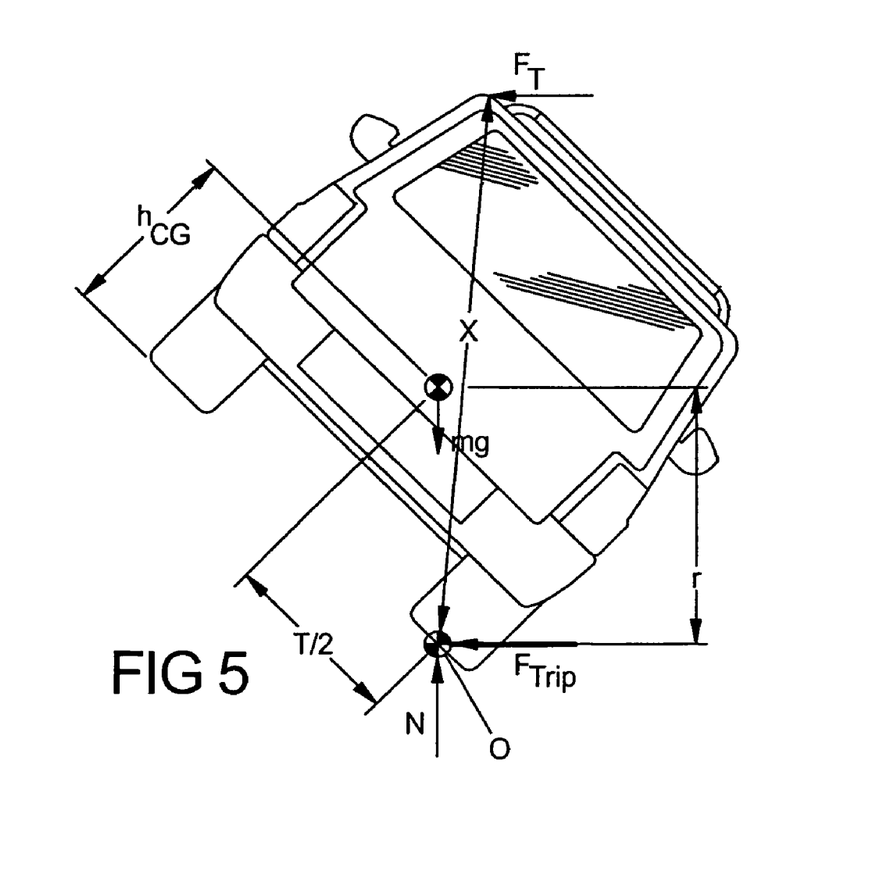
FIG. 5 is a force diagram illustrating the relevant forces relating to a vehicle with the anti-roll thrusters during a roll condition.

Thus, the conservation of system energy provides the equation:

$$\frac{1}{2}I_O\dot{\theta}_0^2 \geq mg(r - r\sin\theta_0)$$

$$\text{or } \dot{\theta}_0 \geq \sqrt{\frac{2mgr}{I_O}(1-\sin\theta_0)} = CRR$$

$$\text{where } r = \sqrt{h_{CG}^2 + \frac{T^2}{4}}$$

where the value $I_O$ is the moment of inertia about the 0 point, as illustrated in FIG. 5.

Table 5 provides the CRR values for the target vehicle and example vehicle as well as providing the SSF and CSF values for these vehicles.

TABLE 5

|  | T mm | $h_{CG}$ mm | Mass kg | $I_{CG}$ kg-m^2 | SSF | CSV m/s | CRR rad/s |
|---|---|---|---|---|---|---|---|
| Target | 1467 | 535 | 1577 | 568 | 1.37 | 5.50 | 2.48 |
| Example Vehicle | 1419 | 664 | 1729 | 580 | 1.07 | 4.18 | 2.17 |

In order to increase the example vehicle's effective CRR value from 2.17 rad/s to 2.48 rad/s, the target CRR, a thrust force of 1.01 kN is required using the equations:

$$[ECRR]_{EXAMPLE} = \left[\sqrt{CRR^2 + \frac{2F_T X \dot{\theta}}{I_O}}\right]_{EXAMPLE}$$

$$[CRR]_{TARGET} = \left[\sqrt{\frac{2mgr}{I_O}(1-\sin\theta_0)}\right]_{TARGET}$$

wherein the value of the thrust force $F_T$ can be determined from the equation:

$$F_T = \left[\frac{I_O}{2X\dot{\theta}}\right]_{EXAMPLE} \{[CRR]_{TARGET}^2 - [CRR]_{EXAMPLE}^2\}$$

Table 6 provides a comparison between the equivalent SSF, equivalent CSV, and equivalent CRR design strategy and illustrates the required mass flow rate and nozzle throat area which are calculated based on required thrust force for each of these design strategies.

TABLE 6

|  | SSF | ESSF | CSV m/s | ECSV m/s | CRR rad/s | ECRR rad/s |
|---|---|---|---|---|---|---|
| Target | 1.37 | 1.37 | 5.50 | 5.50 | 2.48 | 2.48 |
| Example Vehicle | 1.07 | 1.07 | 4.18 | 4.18 | 2.17 | 2.17 |
| Example w/ART - Equivalent SSF | 1.07 | 1.37 | 4.18 | 5.18 | 2.17 | 2.69 |
| Example w/ART - Equivalent CSV | 1.07 | 1.48 | 4.18 | 5.50 | 2.17 | 2.85 |
| Example w/ART - Equivalent CRR | 1.07 | 1.24 | 4.18 | 4.79 | 2.17 | 2.48 |

TABLE 6-continued

| Thruster Specification | Equivalent SSF | Equivalent CSV | Equivalent CRR |
|---|---|---|---|
| Thrust force, kN | 1.75 | 2.38 | 1.01 |
| Mass flow rate, kg/s | 3.51 | 4.77 | 2.03 |
| Sonic speed of nitrogen gas at 600° K, m/s | 499 | 499 | 499 |
| Total nozzle throat area, m^2 | 0.0019 | 0.0026 | 0.0011 |
| Throat diameter of one nozzle design, mm | 49 | 57 | 38 |
| Throat diameter of two nozzles design, mm | 35 | 41 | 27 |
| Thrusting duration, msec | ? | ? | ? |
| Total gas mass, kg | ? | ? | ? |
| Activation threshold | ? | ? | ? |

Any one of the equivalent design strategies can be utilized or selected for determining the required thrusting duration of the thrusters 14L, 14R. The following provides an example of the use of the effective critical roll rate (CRR) value to determine a required thrusting duration of the anti-roll thrusters 14L, 14R. The ECRR is essentially the minimum roll rate for the example vehicle to make a quarter roll against the thrust force of the thrusters 14L, 14R. The required thrusting duration and total gas mass can be calculated for each design strategy as illustrated in Table 7.

TABLE 7

|  | SSF | ESSF | CSV m/s | ECSV m/s | CRR rad/s | ECRR rad/s |
|---|---|---|---|---|---|---|
| Target | 1.37 | 1.37 | 5.50 | 5.50 | 2.48 | 2.48 |
| Example Vehicle | 1.07 | 1.07 | 4.18 | 4.18 | 2.17 | 2.17 |
| Example Vehicle w/Thruster - Equivalent SSF | 1.07 | 1.37 | 4.18 | 5.18 | 2.17 | 2.69 |
| Example Vehicle w/Thruster - Equivalent CSV | 1.07 | 1.48 | 4.18 | 5.50 | 2.17 | 2.85 |
| Example Vehicle w/Thruster - Equivalent CRR | 1.07 | 1.24 | 4.18 | 4.79 | 2.17 | 2.48 |

| Thruster Specification | Equivalent SSF | Equivalent CSV | Equivalent CRR |
|---|---|---|---|
| Thrust force, kN | 1.75 | 2.38 | 1.01 |
| Mass flow rate, kg/s | 3.51 | 4.77 | 2.03 |
| Sonic speed of nitrogen gas at 600° K, m/s | 499 | 499 | 499 |
| Total nozzle throat area, m^2 | 0.0019 | 0.0026 | 0.0011 |
| Throat diameter of one nozzle design, mm | 49 | 57 | 38 |
| Throat diameter of two nozzles design, mm | 35 | 41 | 27 |
| Thrusting duration, msec | 829 | 743 | 986 |
| Total gas mass, kg | 2.9 | 3.5 | 2.0 |
| Activation threshold | ? | ? | ? |

Using the effective critical roll rate to determine a required thrusting duration of the thrusters, the equation of motion is:

$$I_O\ddot{\theta} + rmg\cos\theta + F_T X = 0$$

where $$r = \sqrt{\frac{T^2}{4} + h_{CG}^2}$$

with initial condition at time $t_0$ and terminal conditions at time $t_e$ being:

$$\theta(t_0)=\theta_0 \text{ and } \dot{\theta}(t_0)=ECRR$$

$$\theta(t_e) = \frac{\pi}{2} \text{ and } \dot{\theta}(t_e) = 0$$

Each of the required values is illustrated in FIG. 5 which illustrates the vehicle 10 in a critical position for a quarter roll. Before reaching such a position, the gravity force acting at the mass center of the vehicle is against the roll. Once exceeding such a position, the gravity force will now help the roll and a vehicle will never recover from a roll without the intervention of external forces. The activation criterion for the thrusters 14L, 14R are determined by using the instantaneous critical roll rate (ICRR) which is determined by the equation:

$$\frac{1}{2}I_O\dot{\theta}^2 \geq mg(r - r\sin\theta)$$

$$\text{or } \dot{\theta} \geq \sqrt{\frac{2mgr}{I_O}(1-\sin\theta)} = ICRR$$

$$\text{where } r = \sqrt{h_{CG}^2 + \frac{T^2}{4}}$$

Figure 6:
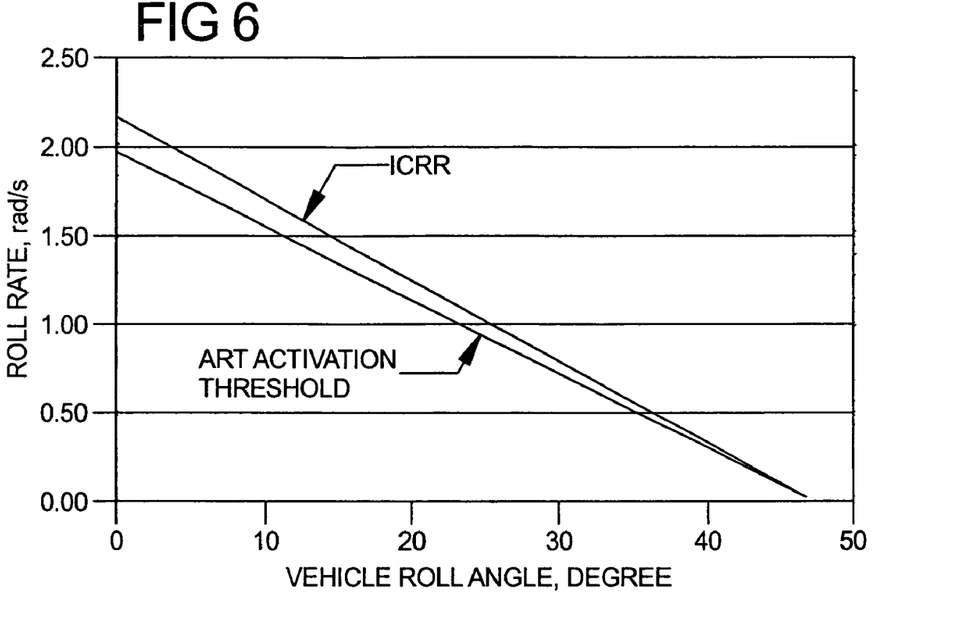
FIG. 6 is an illustration of the instantaneous critical roll rate utilized for determining activation of the thrusters according to the principles of the present invention.

The example vehicle's instantaneous critical roll rate as a function of the roll angle is shown plotted in FIG. 6. In theory, the example vehicle will never recover from a roll if its instantaneous roll rate exceeds the instantaneous critical roll rate as shown in FIG. 6. Accordingly, the activation threshold of the anti-roll thruster must be set lower than the instantaneous critical roll rate. One way to determine the activation threshold is to set the threshold value equal to "s" times of the ICRR values, where "s" is a scaling factor which is less than, or equal to, one and greater than zero. Also plotted in FIG. 6 is an example activation threshold which is 90 percent of the instantaneous critical roll rate.

Figure 7:
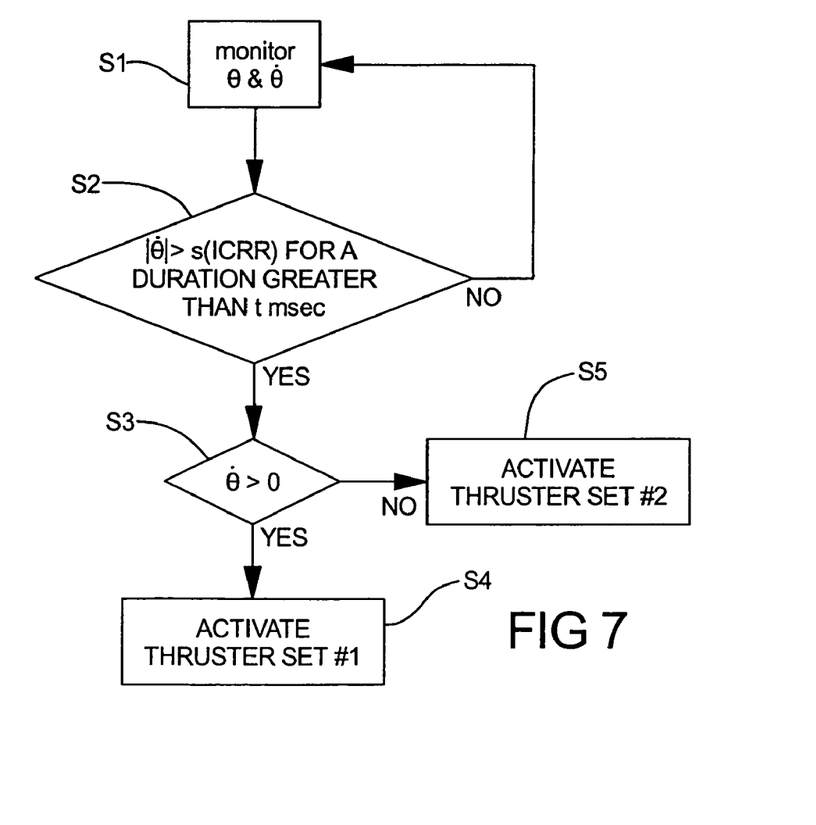
FIG. 7 is a flow diagram illustrating an activation algorithm that is established based on the instantaneous critical roll rate value as determined in FIG. 6.

With reference to FIG. 7, an example activation algorithm is provided, in which at step S1 the roll rate of the vehicle is used to compare with an activation threshold that is established based on the ICRR value, as shown in FIG. 6. At step S2, if the roll rate of the vehicle has been greater than a threshold value for more than t milliseconds (for example, 5 milliseconds), and if the roll rate ($\dot{\theta}$) is greater than 0 (step S3), a corresponding set of thrusters (14L, step S4), on the left side of the vehicle, will be activated to generate thrust forces to resist the roll. If the roll rate $\dot{\theta}$ is not greater than 0, then a second set of thrusters 14R, on the right side of the vehicle, are activated at step S5. For example, an activation threshold of 1.95 RAD/s (i.e., 90 percent of the vehicle's CRR value) is chosen for all three designs, as illustrated in Table 8 below.

TABLE 8

|  | SSF | ESSF | CSV m/s | ECSV m/s | CRR rad/s | ECRR rad/s |
|---|---|---|---|---|---|---|
| Target | 1.37 | 1.37 | 5.50 | 5.50 | 2.48 | 2.48 |
| Example vehicle | 1.07 | 1.07 | 4.18 | 4.18 | 2.17 | 2.17 |
| Example vehicle w/Thruster - Equivalent SSF | 1.07 | 1.37 | 4.18 | 5.18 | 2.17 | 2.69 |
| Example vehicle w/Thruster - Equivalent CSV | 1.07 | 1.48 | 4.18 | 5.50 | 2.17 | 2.85 |
| Example vehicle w/Thruster - Equivalent CRR | 1.07 | 1.24 | 4.18 | 4.79 | 2.17 | 2.48 |

| Thruster Specification | Equivalent SSF | Equivalent CSV | Equivalent CRR |
|---|---|---|---|
| Thrust force, kN | 1.75 | 2.38 | 1.01 |
| Mass flow rate, kg/s | 3.51 | 4.77 | 2.03 |
| Sonic speed of nitrogen gas at 600° K, m/s | 499 | 499 | 499 |
| Total nozzle throat area, m^2 | 0.0019 | 0.0026 | 0.0011 |
| Throat diameter of one nozzle design, mm | 49 | 57 | 38 |
| Throat diameter of two nozzles design, mm | 35 | 41 | 27 |
| Thrusting duration, msec | 829 | 743 | 986 |
| Total gas mass, kg | 2.9 | 3.5 | 2.0 |
| Activation threshold (roll rate >90% CRR), rad | 1.95 | 1.95 | 1.95 |

The method described above can be easily expanded to all types of vehicles, including cars, trucks, vans, and sport utility vehicles. For an example vehicle, the generalized equivalent SSF, CSV, and CRR formulas are as follows:

$$ESSF_{EXAMPLE} = \left[\frac{T}{2h_{CG}} + \frac{F_T X}{mgh_{CG}}\right]_{EXAMPLE}$$

$$ECSV_{EXAMPLE} = \left[\sqrt{\frac{2gI_O}{mh_{CG}^2}(r - h_{CG}) + \frac{2I_O F_T X \dot{\theta}}{m^2 h_{CG}^2}}\right]_{EXAMPLE}$$

$$ECCR_{EXAMPLE} = \left[\sqrt{\frac{2mg(r - h_{CG})}{I_O} + \frac{2F_T X \dot{\theta}}{I_O}}\right]_{EXAMPLE}$$

Each of these generalized equivalent formulas are utilized to make a given vehicle perform like a target vehicle or, according to a predetermined SSF, CSV, or CRR value. The required thrust force formulas that makes a given vehicle perform like a target vehicle with respect to each of the three design strategies is calculated according to the following alternative equations.

$$[F_T]_{EXAMPLE} = \left[\left(\frac{SSF_{TARGET}}{SSF_{EXAMPLE}}\right) - 1\right]\left(\frac{mgT}{2X}\right)_{EXAMPLE}$$

$$[F_T]_{EXAMPLE} = \left[\frac{m^2 h_{CG}^2}{2I_O X \dot{\theta}}\right]_{EXAMPLE}(CSV_{TARGET}^2 - CSV_{EXAMPLE}^2)$$

$$[F_T]_{EXAMPLE} = \left[\frac{I_O}{2X\dot{\theta}}\right]_{EXAMPLE}(CRR_{TARGET}^2 - CRR_{EXAMPLE}^2)$$

wherein, in the above equations, $$SSF = \frac{T}{2h_{CG}}$$

$$CSV = \sqrt{\frac{2gI_O}{mh_{CG}^2}(r - h_{CG})}$$

-continued $$CRR = \sqrt{\frac{2mg}{I_O}(r - h_{CG})}$$

$$I_O = I_{CG} + mr^2$$

$$r = \sqrt{h_{CG}^2 + \frac{T^2}{4}}$$

$$\theta_0 = \tan^{-1}\left(\frac{2h_{CG}}{T}\right)$$

$$\hat{\theta} = \frac{\pi}{2} - \theta_0$$

The equivalent CRR design strategy can be further generalized using the principle of energy conservation. Specifically, the thrusters are so designed that they will do anti-roll work equivalent to the difference between the one-quarter turn roll-over kinetic energy of an example vehicle and a target value. The anti-roll work done by the thrusters, $W_T$, can be calculated as follows:

$$W_T = \left(\frac{CRR_{TARGET}}{CRR_{EXAMPLE}}\right)^2 [KE_C]_{EXAMPLE} - [PE_C]_{EXAMPLE}$$

where $[KE_C]_{EXAMPLE}$ is the kinetic energy of the example vehicle at its critical roll rate and $[PE_C]_{EXAMPLE}$ is the potential energy of the same example vehicle at its critical roll angle:

$$[KE_C]_{EXAMPLE} = \frac{1}{2}[I_O CRR^2]_{EXAMPLE}$$

$$[PE_C]_{EXAMPLE} = [mg(r - h_{CG})]_{EXAMPLE}$$

and the required thrust force for the example vehicle can now be inversely calculated using the following equation:

$$W_T = \left[\int_{\theta_0}^{\frac{\pi}{2}} F_T X d\theta\right]_{EXAMPLE} = \left[\int_{t_0}^{t_e} F_T X \dot{\theta} dt\right]_{EXAMPLE}$$

The product of the required thrust force and its total duration; i.e., $t_e - t_0$, is the required impulse.

Figure 8:
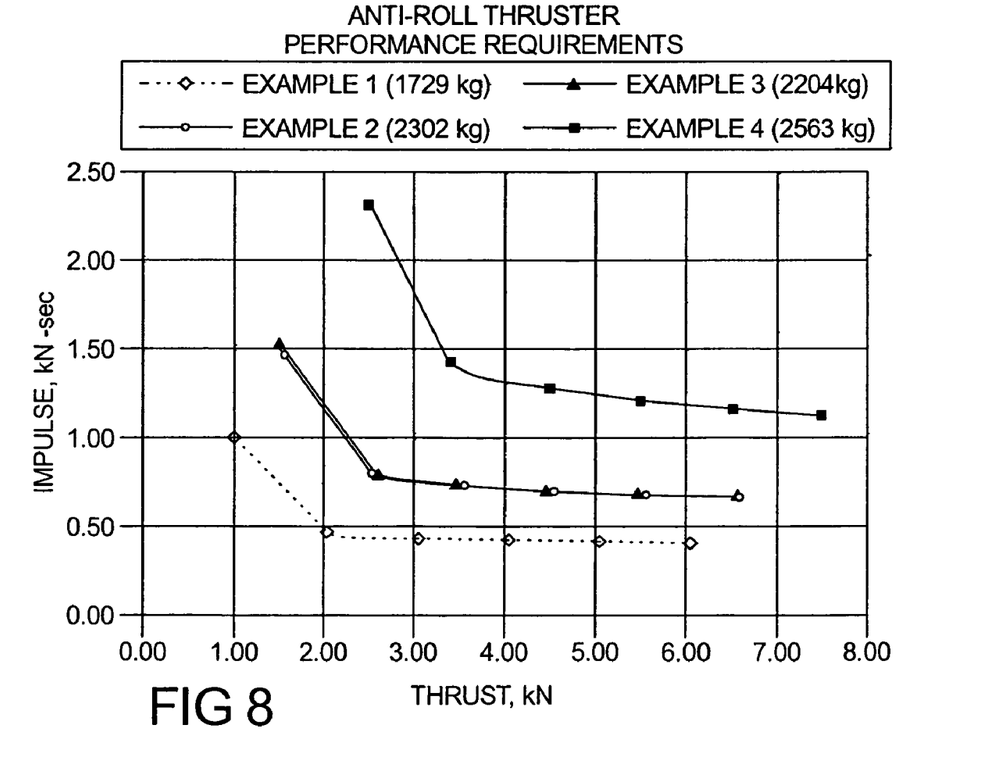
FIG. 8 is a graph illustrating the target design space of required thrust force and impulse to satisfy the design criteria according to the principles of the present invention.

Table 9 shows the calculated SSF, CSV, and CRR values for a target vehicle and four different example vehicles. Table 10 shows the kinetic energy of each vehicle with the target critical roll rate value (i.e., $CRR_{TARGET}$=2.48 rad/s), the potential energy of each vehicle at its critical roll position, and the required work done by the thrusters to make up the difference of the CRR value between the garget vehicle and each example vehicle. FIG. 8 is a plot of the target design space for anti-roll thruster performance with impulse plotted versus thrust. FIG. 8 depicts the target design space of required thrust force and impulse to make each of the example vehicles depicted in Table 9 perform like the target vehicle using the generalized ECRR design strategy. Exemplary commercial rocket motors, such as those listed in Table 11, which are each available from Tally Defense Systems, can be utilized as the thrusters 14L, 14R in accordance with the principles of the present invention. Alternatively, specially designed solid, gas, or liquid propellant rocket motors could be used to provide the required thrust forces.

TABLE 9

| | T mm | $h_{CG}$ mm | Mass kg | $I_{CG}$ kg-m^2 | $I_O$ kg-m^2 | SSF | CSV m/s | CRR rad/s |
|---|---|---|---|---|---|---|---|---|
| Target | 1467 | 535 | 1577 | 568 | 1868 | 1.37 | 5.50 | 2.48 |
| Example 1 | 1419 | 664 | 1729 | 580 | 2212 | 1.07 | 4.18 | 2.17 |
| Example 2 | 1543 | 654 | 2204 | 1101 | 3355 | 1.18 | 4.99 | 2.14 |
| Example 3 | 1422 | 690 | 2302 | 749 | 3008 | 1.03 | 4.02 | 2.12 |
| Example 4 | 1689 | 768 | 2563 | 1244 | 4584 | 1.10 | 4.71 | 2.02 |

TABLE 10

| Vehicle | $KE_C$, Kinetic Energy with Critical Roll Rate (kJ) | $PE_C$, Potential Energy Gain at Critical Position (kJ) | $W_T$, Required Work Done by the Thrusters (kJ) |
|---|---|---|---|
| Target | 5.76 | 5.76 | 0 |
| Example 1 | 6.82 | 5.21 | 1.61 |
| Example 2 | 9.28 | 6.78 | 2.50 |
| Example 3 | 10.35 | 7.72 | 2.63 |
| Example 4 | 14.14 | 9.38 | 4.76 |

TABLE 11

Talley Defense Systems
ROCKET MOTORS

| | Weight (lb) | | Action Time | Normal Impulse | Motor Thrust | DIA. | Length | Propellant |
|---|---|---|---|---|---|---|---|---|
| Program | Loaded | Burned | (sec) | (kN-sec) | (kN) | (mm) | (mm) | Type |
| Mark 1 | 15.9 | 11.1 | 0.190 | 4.63 | 29 | 104 | 356 | HTPB |
| M913 Rocket Motor | Propellant Weight 2.2 | | 1.7 | 1.87 | 1.09 | 91 | 109 | HTPB |
| IDS Rocket Motor | Propellant Weight 1.75 | | 0.375 | 1.72 | 5.12 | 101 | 178 | HTPB |
| SuperBarricade SuperPalisade Short Range | Propellant Weight .86 | | 0.62 | 0.76 | 2.29 | 94 | 53 | HTPB |

TABLE 11-continued

Talley Defense Systems
ROCKET MOTORS

| Program | Weight (lb) Loaded | Weight (lb) Burned | Action Time (sec) | Impulse (kN-sec) | Normal Thrust (kN) | Motor DIA. (mm) | Motor Length (mm) | Propellant Type |
|---|---|---|---|---|---|---|---|---|
| SuperBarricade SuperStockade Long Range | Propellant Weight 1.77 | | 0.62 | 1.67 | 3.90 | 94 | 104 | HTPB |

The role of the thruster system is in rollover avoidance. The thrusters are preferably used in combination with other stabilization systems as well as airbag protection systems which are currently used in the automotive industry. In particular, the thrusters can be utilized in order to supplement these other vehicle stabilization systems during a detected potential rollover condition. In particular, currently utilized variable ride height suspension systems and electronic stability control and braking control systems are utilized as a first line of defense against vehicle rollover, while the thrusters can be viewed as a last counter-measure that a vehicle can undertake to avoid an imminent rollover accident. The variable ride height suspension system can be utilized, for example, prior to a detected potential roll condition with electronic stability control also being utilized in the time frame of several thousand milliseconds to several hundred milliseconds prior to the projected roll conditions. Furthermore, the thrusters can be employed within the last few hundred milliseconds as a final counter-measure for counteracting vehicle roll forces. Furthermore, airbags can be utilized in order to protect passengers after the thrusters are employed. It should be appreciated that the system of the present invention would not be effective to prevent all severe roll events, but could be potentially useful for some less severe roll events. It will be appreciated that the thruster system could also be used for anti pitch. Furthermore, any safety for the occupant, surrounding vehicles and pedestrians would need to be considered for carrying the thrusters on the vehicles.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A roll stabilization system for a motor vehicle, comprising:
 a first thruster mounted on a first side of said motor vehicle;
 a second thruster mounted on a second side of said motor vehicle;
 a controller system for detecting a potential roll condition of said motor vehicle and activating at least one of said first and second thrusters for generating a counteracting force for resisting the detected potential rollover condition, wherein said first and second thrusters are each mounted in side pillars of said motor vehicle.

2. The roll stabilization system according to claim 1, wherein said first and second thrusters are rocket motors.

* * * * *